(No Model.) 3 Sheets—Sheet 1.

W. M. McDOUGALL.
CORN HUSKING MACHINE.

No. 391,172. Patented Oct. 16, 1888.

Witnesses:
J. Staib
Chas. H. Smith

Inventor:
William M. McDougall.
per Lemuel W. Serrell
atty.

(No Model.) 3 Sheets—Sheet 2.

W. M. McDOUGALL.
CORN HUSKING MACHINE.

No. 391,172. Patented Oct. 16, 1888.

Witnesses:
J. Staib
Chas. H. Smith

Inventor:
William M. McDougall
per Lemuel W. Serrell, Atty (No Model.) 3 Sheets—Sheet 3.

W. M. McDOUGALL.
CORN HUSKING MACHINE.

No. 391,172. Patented Oct. 16, 1888.

Witnesses:
J. Stail
Chas H Smith

Inventor:
William M. McDougall
per Lemuel W. Serrell
Atty

UNITED STATES PATENT OFFICE.

WILLIAM M. McDOUGALL, OF EAST ORANGE, NEW JERSEY.

CORN-HUSKING MACHINE.

SPECIFICATION forming part of Letters Patent No. 391,172, dated October 16, 1888.

Application filed June 27, 1887. Serial No. 242,625. (No model.)

*To all whom it may concern:*

Be it known that I, WILLIAM M. McDOUGALL, of Grovestend, East Orange, in the county of Essex and State of New Jersey, have invented an Improvement in Corn-Husking Machines, of which the following is a specification.

Corn-husking machines with inclined husking-rollers, in pairs, have been constructed; but difficulty has been experienced in making the husking-rollers sufficiently small to grasp the small projecting portions of the husks and draw off the same.

My invention is for picking up and loosening the husks sufficiently for the rollers to catch and strip off the same; and I also construct the bearings of the rollers in such a manner that the said bearings swivel without the journals binding, so that the rollers may separate at either end sufficiently for the free passage of the husks, and sometimes of pieces of the stem as broken off from the ear, and I provide for cutting off or stripping husks or fibers that otherwise would wind around the stripping-rollers.

Figure 1:
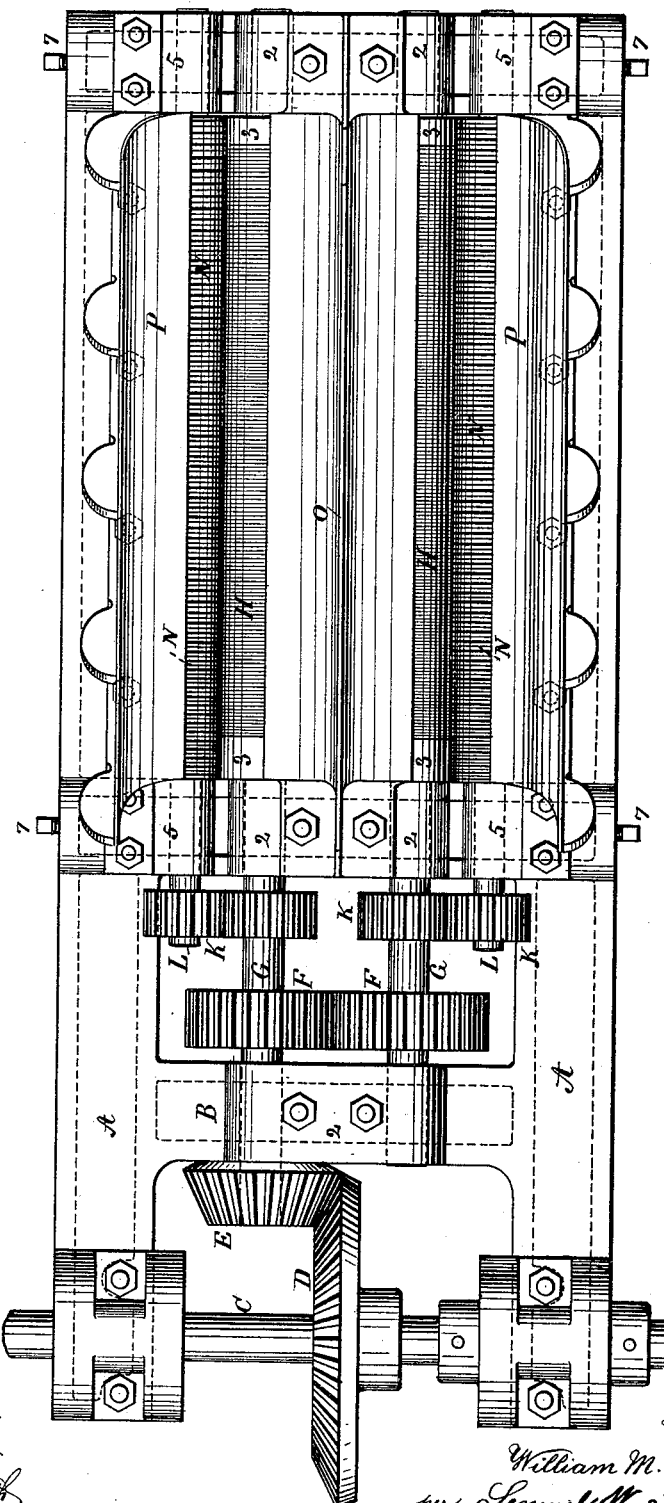
Figure 2:
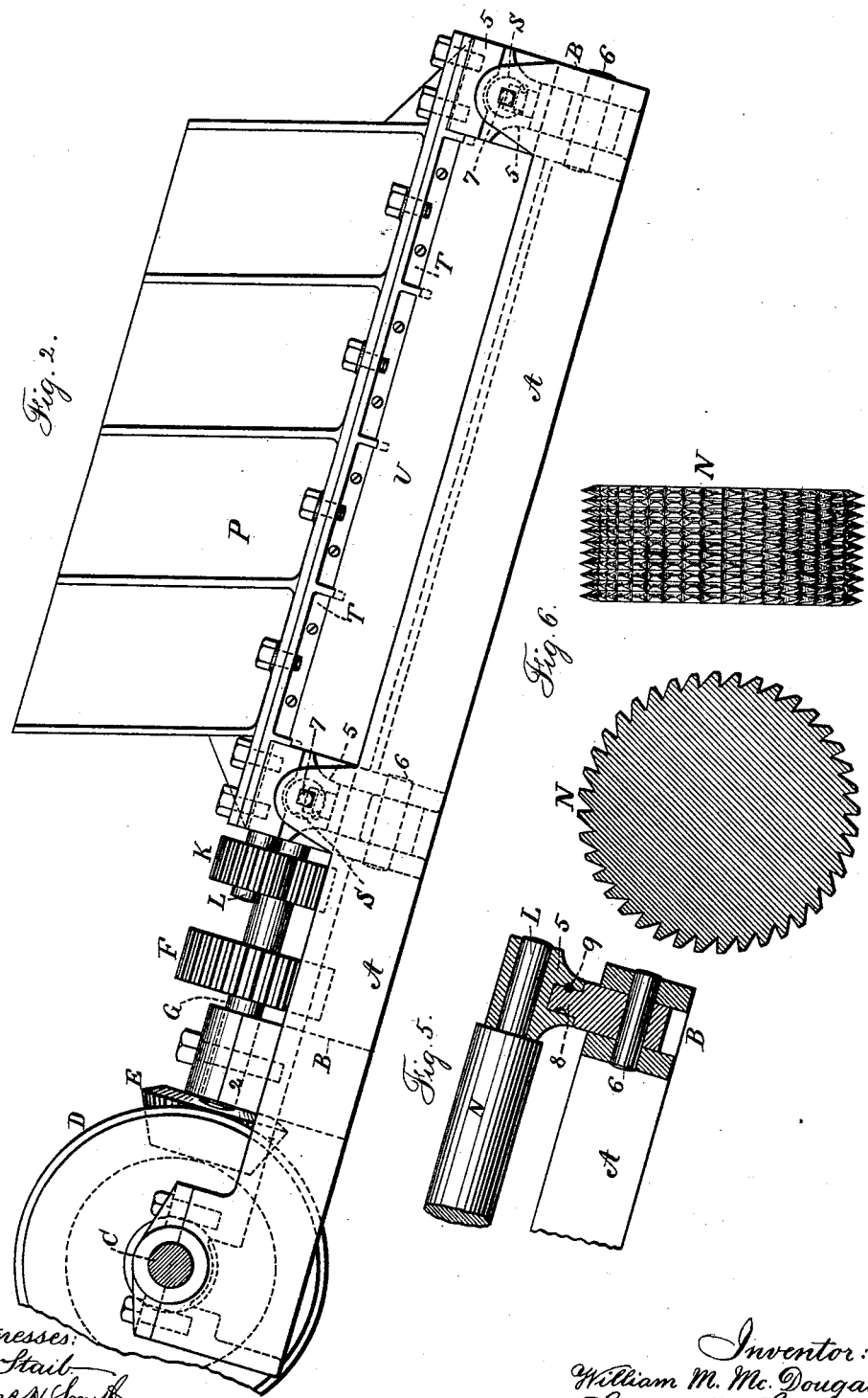
Figure 3:
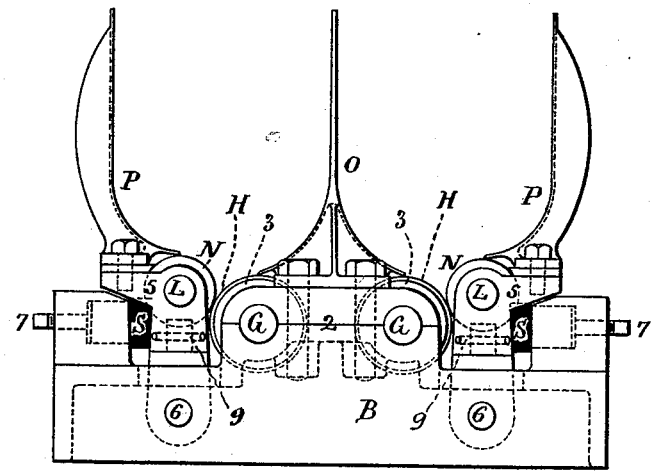
Figure 7:
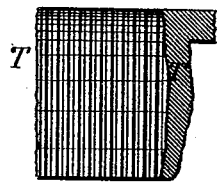
Figure 4:
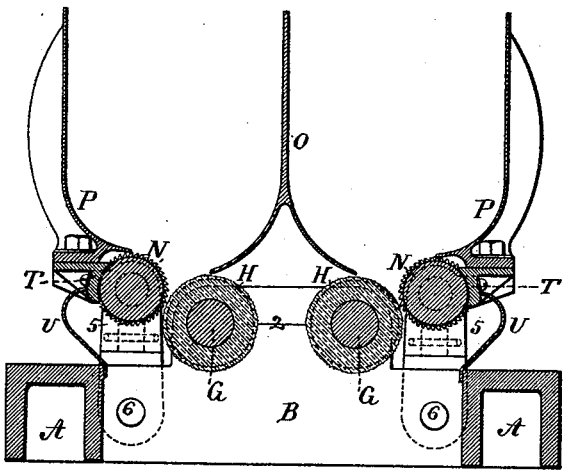

In the drawings, Figure 1 is a plan view of the parts below the feeding-hopper. Fig. 2 is a side elevation. Fig. 3 is an end view. Fig. 4 is a cross-section through the stripping-rolls. Fig. 5 is a longitudinal section through one of the journal-bearings. Fig. 6 shows a section and elevation of part of one of the movable rollers, and Fig. 7 is an inside view of a part of one of the cleaning-combs.

The side frames, A, and cross-frames B are of any usual character, preferably of metal, and I have shown the driving-shaft C, bevel-gears D E, and the gears F connecting the shafts G of the standing rollers H, and the gears K connecting the shafts G to the shafts L of the movable rollers N. The gearing, however, does not form any portion of my present invention.

The rollers N H are in pairs, and they act as strippers to the corn-husks as the ear of corn slides down upon such rollers, these rollers occupying an inclined position, as heretofore usual.

The shafts G are in stationary bearings 2 upon the cross-frames B, and I prefer to make these cross-frames of cast-iron and hollow or U-shaped, like side bars, A. (Shown in Fig. 4, and as indicated by the dotted lines in Fig. 1.)

Each roller H is made of the shaft G, with heads 3, and with flat rings, of woven cloth cut out and threaded upon the shaft, compressed tightly and held firmly between the movable heads 3. I find in practice that the rollers H made of rings of woven cloth are preferable to rubber rollers, or to rollers of leather, heretofore employed, because the entire surface of each roller assumes the form of a brush, the fibers standing out radially, and these brush up and loosen the edges of the husks, and such rollers are very durable.

The outer or movable rollers, N, are preferably of steel and smaller in diameter than the rollers H, and the surfaces of these rollers N are composed of numerous small hook-pointed teeth. These teeth are made by grooving each roll peripherally with narrow grooves about one-twelfth of an inch apart, (more or less,) and the surfaces of said rollers are channeled lengthwise with V-shaped channels, one side of each V-shaped channel being nearly in a radial plane, so that the numerous teeth thus formed are hook ended or pointed, the nearly radial faces of the teeth being at the front ends of the teeth as the rolls revolve, so that these faces catch the husks and loosen and tear them, and such husks are carried down between the pairs of rolls and caught by them and stripped off the ears of corn, and the husks fall away from below the pairs of rolls.

In consequence of the shape given to the teeth and the numerous teeth upon the husking-rolls, I am able to shorten the husking-rolls and to strip off the husks before the ears reach the lower ends of the pairs of rolls, and I am also enabled to make the husking-rolls smaller than heretofore possible, and at the same time maintain the necessary strength.

I make use of a central partition, O, which remains in a fixed position above the rolls H, and the troughs P above the rolls N are connected with the movable bearings for such rolls N, and the ears of corn slide down between the troughs P and the central partition, O.

The cross-pieces B are cast with openings for the reception of the lower parts of the bearings 5. These bearings are supported by and swing upon the bolts 6, and there are springs of rubber, S, with followers and screws 7, that act against the outer faces of the swinging bearings 5 to press them and the rollers N toward the rollers H, and thereby apply the necessary yielding force in gripping and pulling off the husks, and I make the bearings 5 in two parts connected together by socket-pins 8, grooved peripherally and kept together by cross-pins 9, which prevent the two parts of the bearing separating, but which allow the socket-pins to turn in the socket. This is of great importance, as it allows the journals and boxes of the rollers N to swing or swivel when one end of the roller is separated more than the other end from the adjacent standing roller H.

At the upper ends of the journal-bearings 5 are lateral projections, upon which are bolted the ends of the clearing-combs T, and the same bolts are made use of for securing the flanges at the ends of the troughs P. The clearing-combs T are preferably of steel, and in the form of L-shaped bars, the sides of which are adjacent to the rollers N, are concave, and ribbed to correspond to the grooved surfaces of the said toothed rollers N, so that these combs are very stiff and strong, and their lower edges come below the level of the axis of the rollers N; hence any husks or silk that may be stripped off the corn and become entangled in the teeth of either roller N are cut off and removed by the action of the stationary cleaning-comb, and these materials fall away beneath the machine along with the husks, and the sheet-metal shields U upon the frame of the machine prevent the husks or other matter stripped from the rollers N by the combs T from being thrown outside the frame of the machine.

This machine is compact and portable without interfering with its efficiency.

I claim as my invention—

1. The combination, in a corn-husking machine, of two inclined rolls geared together, one of which has a surface formed of rings of woven cloth threaded upon a shaft and clamped together, and the other roller has a metallic surface with numerous teeth upon its surface, substantially as specified.

2. The combination, in a corn-husking machine, of a pair of husking-rolls, stationary bearings for the journals of the standing roll, swinging bearings for the journals of the other roll, and a cleaning-comb fastened at its ends to the upper ends of the swinging bearings and having a concave ribbed surface close to the toothed surface of the rolls, for cutting off and removing any husks or similar substances that may adhere to the teeth, substantially as specified.

Signed by me this 23d day of June, A. D. 1887.

WILLIAM M. McDOUGALL.

Witnesses:
  GEO. T. PINCKNEY,
  WILLIAM G. MOTT.